Oct. 15, 1968   E. H. LAND   3,405,619
CAMERA AND FILM USEFUL THEREIN
Filed May 13, 1966   5 Sheets-Sheet 1

INVENTOR.
Edwin H. Land
BY Brown and Mikulka
and
Robert E. Corb
ATTORNEYS

Oct. 15, 1968   E. H. LAND   3,405,619
CAMERA AND FILM USEFUL THEREIN

Filed May 13, 1966   5 Sheets-Sheet 2

INVENTOR
Edwin H. Land
BY Brown and Mikulka
and
Robert E. Cole
ATTORNEYS

Oct. 15, 1968  E. H. LAND  3,405,619
CAMERA AND FILM USEFUL THEREIN
Filed May 13, 1966  5 Sheets-Sheet 3

INVENTOR.
Edwin H. Land
BY Brown and Mikulka
and
Robert E. Corb
ATTORNEYS

Oct. 15, 1968  E. H. LAND  3,405,619
CAMERA AND FILM USEFUL THEREIN
Filed May 13, 1966  5 Sheets-Sheet 4

INVENTOR.
Edwin H. Land
BY Brown and Mikulka
and
Robert E. Cole
ATTORNEYS

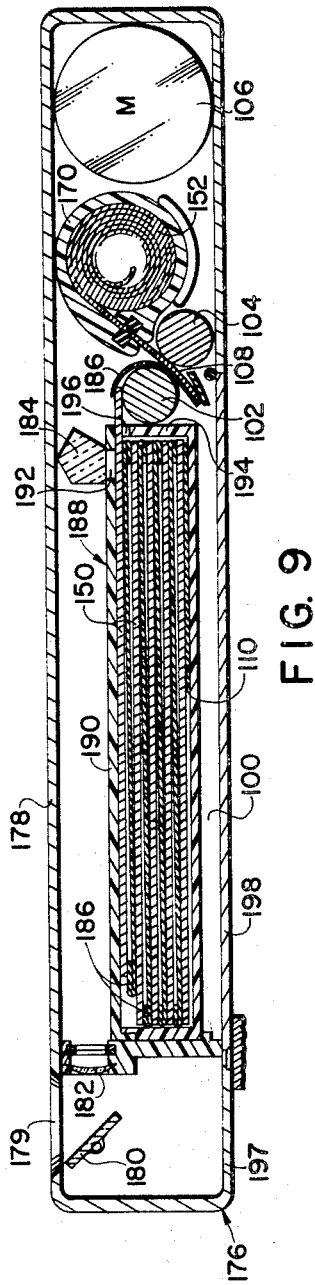
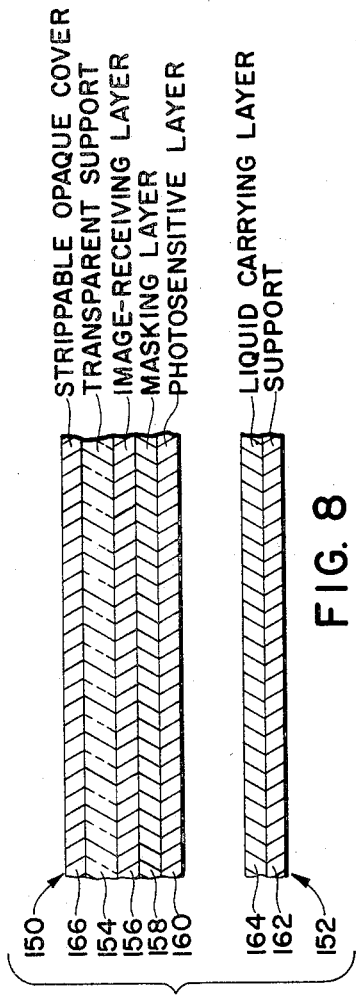

United States Patent Office 3,405,619
Patented Oct. 15, 1968

3,405,619
CAMERA AND FILM USEFUL THEREIN
Edwin H. Land, Cambridge, Mass., assignor to Polaroid Corporation, Cambridge, Mass., a corporation of Delaware
Filed May 13, 1966, Ser. No. 549,961
34 Claims. (Cl. 95—13)

This invention relates to cameras for exposing and processing photosensitive elements and to photographic products incorporating the photosensitive elements and especially constructed to be exposed and processed in this particular type of camera.

Cameras of the "self-developing" type adapted to be hand-held and operated generally comprise a housing for enclosing and positioning photosensitive elements, in the form of sheets, in position for exposure, exposure means including an objective lens and shutter for exposing the photosensitive sheets, means for holding a second or image-receiving sheet adapted to be superposed with each photosensitive sheet following exposure and during processing of the photosensitive sheet, and processing means for pressing each exposed photosensitive sheet against a second sheet and contacting the facing surfaces of the sheets with a liquid processing agent.

Objects of the invention are: to provide a novel and improved non-folding or box camera of the "self-developing" type characterized by an exceptionally compact construction; to provide a camera as described including an exposure system having no shutter and in which exposure and the timing thereof is achieved by moving the photosensitive element; to provide a camera as described in which exposure and processing of the photosensitive element are effected simultaneously during movement of the photosensitive element into superposition with a second element; and to provide a camera having no shutter but including a processing mechanism that performs the same functions as does the shutter of a conventional camera.

Other objects of the invention are: to provide a novel photographic product in the form of an assembly of photosensitive and second sheets, adapted especially for use in the camera of the invention by locating the photosensitive and second sheets in face-to-face spaced apart relation and providing for transmission of light by an image-forming optical system between the two sheets to expose the photosensitive sheet during movement thereof; to provide a photographic product as described including means for locating and guiding a moving photosensitive sheet during exposure and facilitating movement of the exposed photosensitive sheet into superposition with a second sheet; and to provide an assembly of sheets as described including a component of an optical system for exposing the photosensitive sheet and cooperating with a camera to control exposure of the photosensitive sheet.

The camera of the invention is designed to be employed in a conventional manner, that is, to be held in a substantially fixed position during exposure, to produce a normal appearing image of a scene or subject that is also substantially stationary during exposure. Exposure of a photosensitive element is accomplished by moving the element past a relatively narrow aperture at which is formed an image of the scene and simultaneously moving the scene relative to the aperture so that the photosensitive element and image are stationary with respect to one another. In this manner, a narrow portion of the scene, corresponding to the aperture, is scanned continuously from one side of the scene to the other and successive incremental portions of the photosensitive element are exposed continuously to light from corresponding successive incremental portions of the scene. Although the exposure system of this camera is similar in some respects to wide angle or panoramic cameras, the camera of the invention incorporates a distinctive combination of structural features contributing to the achievement of an exceptionally compact and inexpensive, non-folding or box camera structure of the "self-developing" type adapted, insofar as the operator is concerned, to be employed in the usual maner to produce high quality photographs.

Other objects of the invention will in part be obvious and will in part appear hereinafter.

The invention accordingly comprises the apparatus possessing the construction, combination of elements and arrangement of parts, and the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 6:
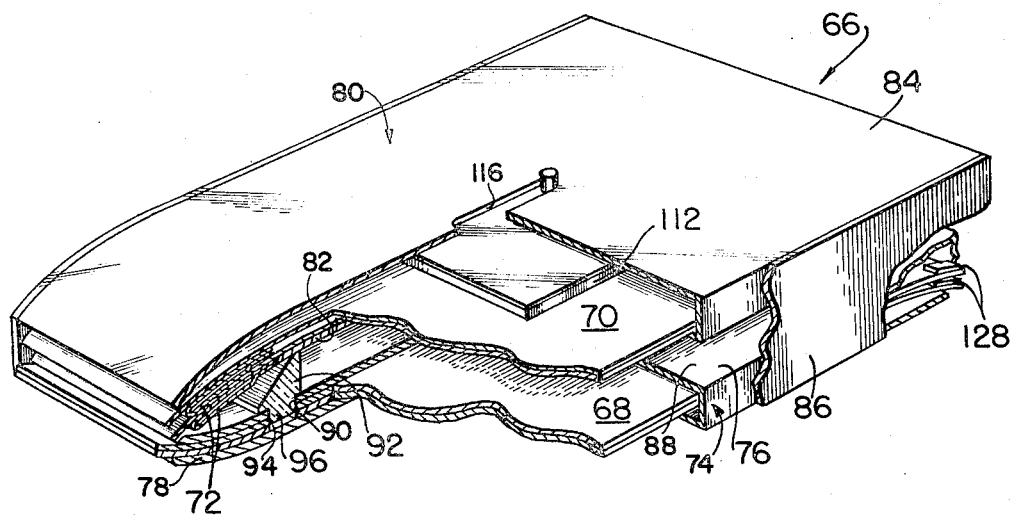
Figure 3:
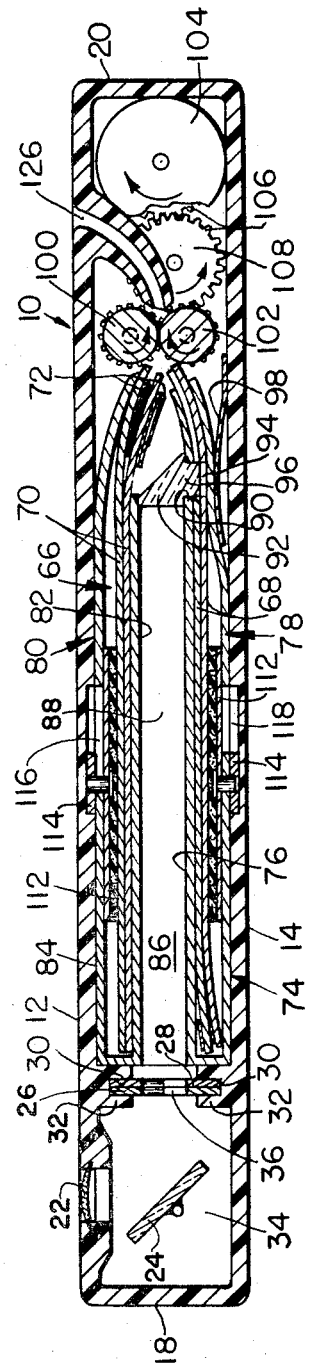
Figure 4:
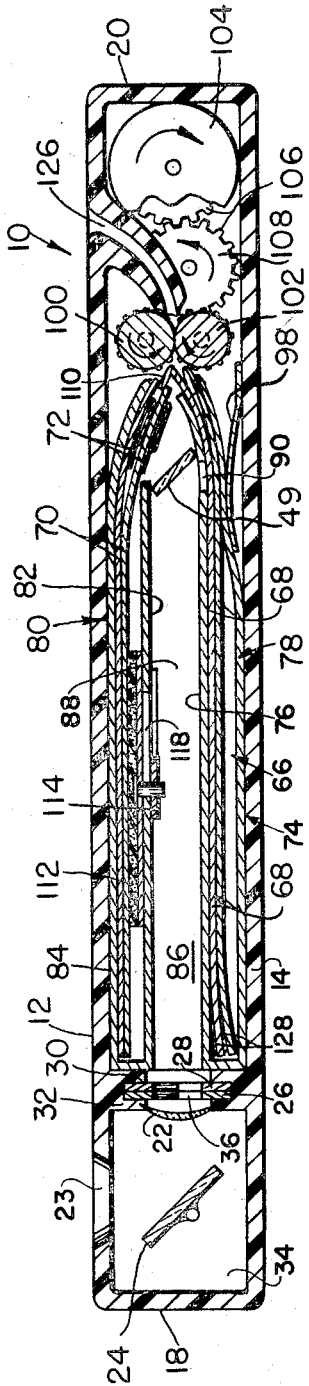
Figure 5:
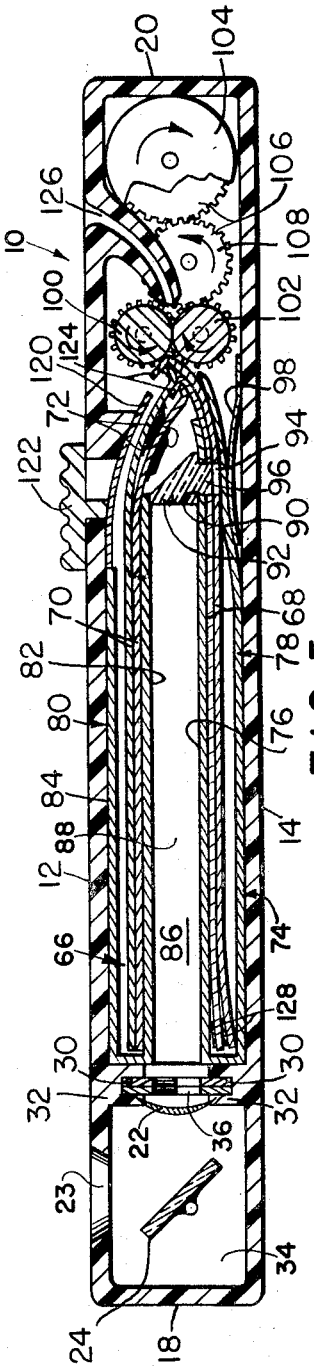
Figure 7:
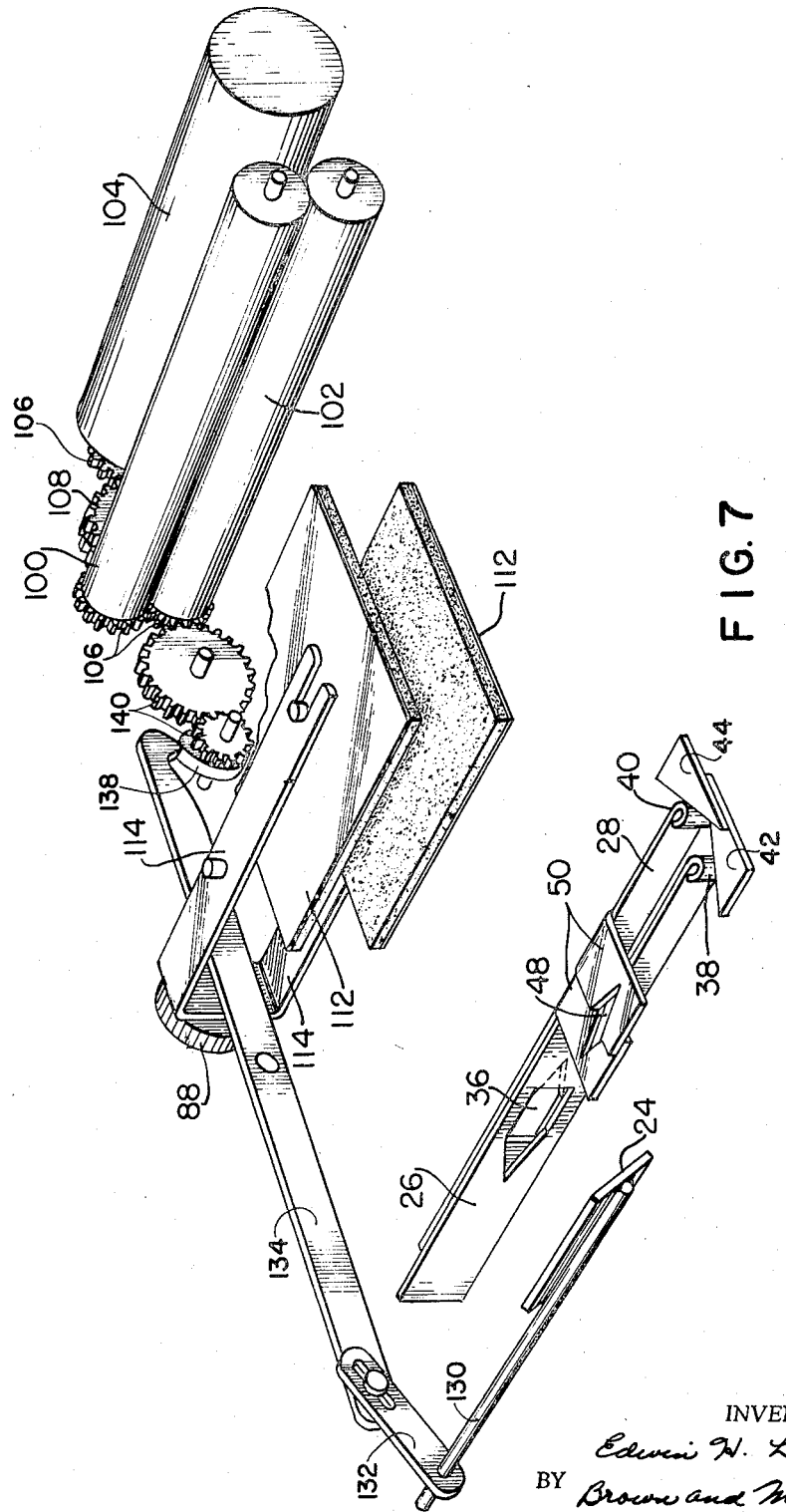

FIGS. 3, 4, and 5 are sectional views of the camera taken substantially midway between the sides thereof shown with a film assembly in operative position within the camera and illustrating various embodiments of the camera and film asembly;

FIG. 6 is a perspective view, partially in section, showing a film assemblage embodying the invention;

FIG. 7 is an exploded perspective view showing the operative components of the camera;

FIG. 8 is a fragmentary sectional view illustrating schematically film materials employed in the camera and film asemblage of the invention; and FIG. 9 is a sectional view similar to FIGS. 3 through 5 illustrating another embodiment of the camera.

The simplest and least expensive camera construction is the "box" camera, that is, a camera with a rigid housing that is neither collapsible nor folding. One of the major factors contributing to the size or bulk of most cameras, particularly box cameras, is the necessity for providing a three-dimensional optical path between an objective lens and the film plane at which an image of the entire scene is formed during exposure of the film. Because of this, the minimum dimensions of the camera are essentially fixed, and are usually the length, width and diagonal of the image. Various expedients have been proposed for making cameras more compact, notably, providing a collapsible or folding housing (e.g., a bellows), but these necessitate complex structures that must be erected or expanded prior to use, and even in the collapsed or folded condition, are still rather bulky. Another factor in determining the size of a camera and also the complexity and cost, is the shutter mechanism required for making exposures when, and of a duration, desired. In addition to these factors contributing to size, complexity, and cost, a self-developing camera must also include means for treating each exposed photosensitive image-recording element with a liquid processing agent usually by pressing the exposed photosensitive element into face-to-face contact with another element and contacting the facing surfaces of the elements with the liquid agent.

According to the invention, a compact box-type camera structure is achieved by eliminating some of the factors heretofore contributing to the bulk of a camera as well as constructing and arranging the components of the camera so as to utilize the space within the camera more efficiently and combine the operations performed on the film employed in the camera. The camera includes a novel exposure system in which one of the dimensions of the optical path, e.g., the image diagonal, is reduced to a minimum, and the other dimensions of the optical path are disposed in the same directions as the length and width of the photosensitive image-recording element. This is accomplished by providing an optical path that is generally parallel with the film plane throughout the major portion of its length and reducing the third dimension of the optical path by forming only an incremental portion of the image of the scene at any instant. The photosensitive elements are moved as they are being exposed and this movement is made a part of the process of forming visible images and is performed by the components of a camera that carry out the processing operations resulting in visible image formation so that, in effect, the mechanism for processing performs the function of the shutter in a conventional camera.

In the camera of the invention, exposure of a photosensitive sheet to produce an image of a scene therein is effected by moving the sheet in an exposure plane past a relatively narrow aperture extending transversely of the direction of movement of the sheet and from side to side of the area of the sheet to be exposed. An image of the scene is formed at the exposure plane and is moved relative to the aperture in the same direction and at the same speed as the photosensitive sheet so as to scan a relatively narrow incremental area of the scene from one side of the scene to the other. The preferred embodiment of the camera is designed to scan the scene and move the film vertically during exposure. Since exposure occurs only during movement of the photosensitive sheet in the exposure plane past the aperture, a shutter is not required because exposure is initiated when the leading end of the photosensitive sheet is moved into alignment with the aperture and is terminated as the trailing end of the photosensitive sheet is moved from alignment with the aperture. The duration of exposure of an incremental area of the film is a function of the aperture width and the speed of movement of the film past the aperture. The total time required to make an exposure is a function of the length of the photosensitive sheet and the speed of its movement. For example, an area of a photosensitive sheet 3 inches in length may be subjected to an exposure of $1/60$ second by moving the sheet past an aperture having a width of 0.15 in. at a rate of 9 inches per second with the total time required for exposure being $1/3$ second.

A photosensitive sheet is located in an initial position with the leading end of the area to be exposed located adjacent and to one side of the aperture, and exposure is made by moving the photosensitive sheet with this leading edge foremost past the aperture in the exposure plane. Processing is accomplished by moving the photosensitive sheet from an initial position with the leading edge foremost into superposition with a second sheet, contacting the facing surfaces of the sheets with a liquid processing agent and pressing the surfaces together. A pair of juxtaposed rolls provide the simplest means for performing the processing operation, and in the camera of the invention also function as a shutter by moving the photosensitive sheet past the aperture to effect the controlled exposure of the photosensitive sheet.

The image of the scene is formed at the exposure plane by an optical system including a conventional objective lens. For a particular combination of lens and shutter size, the length and one other dimension of the three-dimensional optical path between the lens and exposure plane may be considered to be substantially fixed so that a camera structure must be of sufficient size to enclose an optical path having the two remaining invariant dimensions. The dimensions of the exposed area of the photosensitive sheet and the area of the second sheet superposed with the photosensitive sheet during processing also are considered to be substantially invariant and the camera housing must be dimensioned to accommodate sheets of this size. Since the sheets are thin, a maximum number of sheets can be enclosed in a space having one relatively small dimension if the sheets are stacked or otherwise disposed in face-to-face relation. It will be seen that the optical path and the photosensitive and second sheets comprise three-dimensional spaces, each having one dimension that can be reduced substantially and two dimensions that are essentially fixed. A minimum camera size is achieved by a construction in which the irreducible dimensions of both the optics and the sheet materials are in the same directions. Such a camera is thin and has a length dimension dictated by the length of the optical path and the photosensitive sheets, and a width dimension dictated by the width of the image and photosensitive sheets.

The size and complexity of the film handling components of the camera as well as the space occupied by the photosensitive and second sheets are minimized by positioning all of the sheets in stacked face-to-face relation with the sides of the photosensitive sheets adapted to be exposed and superposed with the second sheets facing the appropriate sides of the second sheets. The photosensitive and second sheets are disposed in spaced stacks located in spaced face-to-face relation and the optical path extends from one end of the stacks of sheets between the stacks toward the opposite ends thereof in order to provide for exposure of the inner surfaces of the photosensitive sheets. The processing means include a pair of juxtaposed rolls mounted as close as possible to the opposite end of the stacks for moving successive pairs of photosensitive and second sheets from the stacks simultaneouly and in the same general direction past the aperture through which the sheets are superposed. This aperture is also located between the stacks of sheets as close as possible to the juxtaposed rolls.

Figure 1:
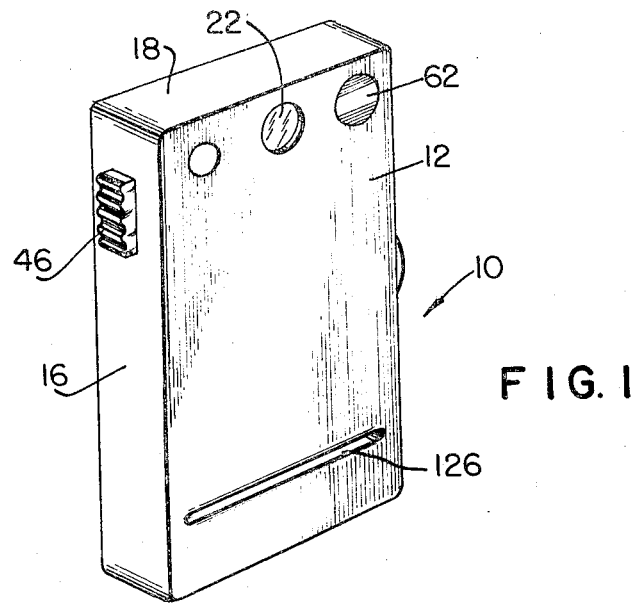
FIGURE 1 is a perspective view of a camera embodying the invention.
Figure 2:
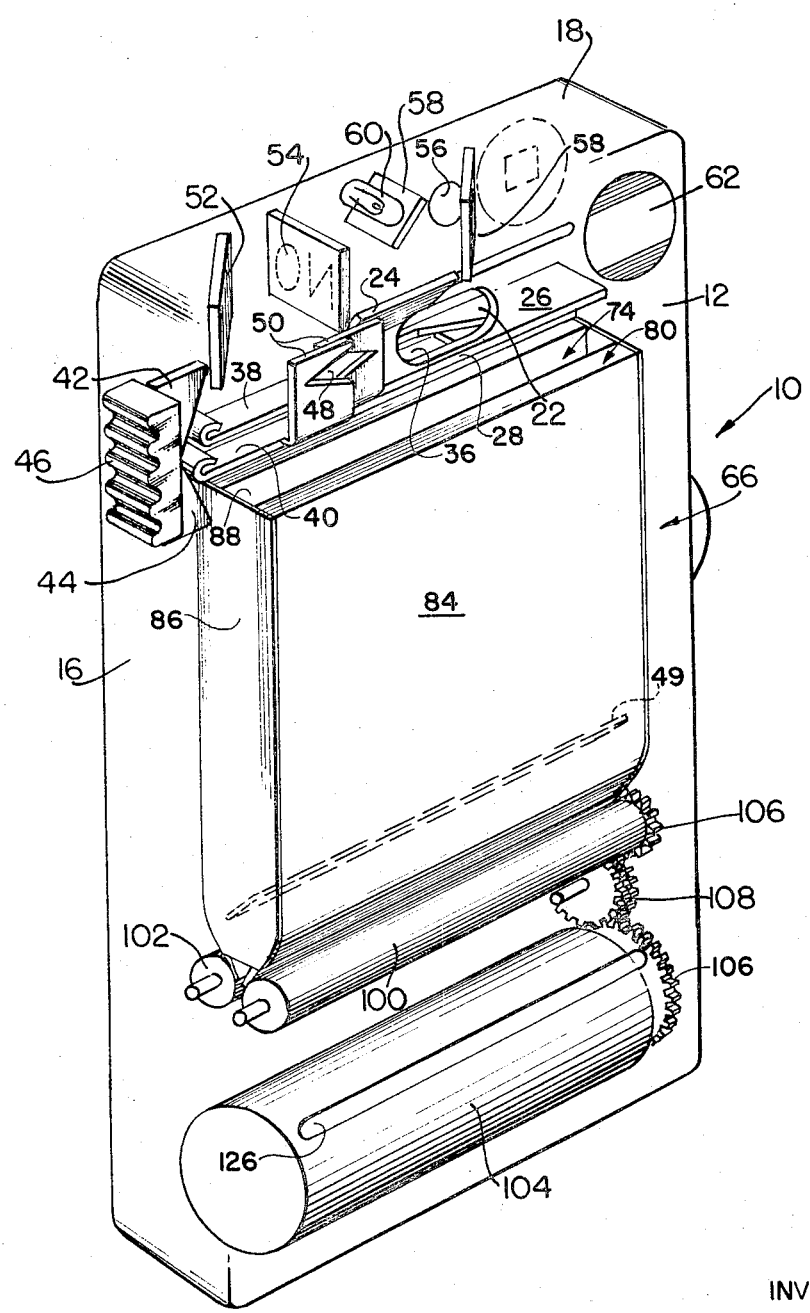
FIG. 2 is a perspective view of the camera showing the operative components thereof.

Reference is now made to FIGURES 1 through 3 wherein there is illustrated a self-developing camera embodying the invention together with a film assembly in the form of a pack especially adapted for use in the camera. The camera, designated 10, comprises a relatively thin, parallelepiped shaped housing including a forward wall 12, rear wall 14, side walls 16, an upper end wall 18, and a lower end wall 20. The housing is provided with suitable doors or movable panels to permit loading of a film assembly or pack into the camera housing.

The camera includes exposure means comprising an image-forming optical system and means for controlling the exposure aperture located within the upper portion of the camera housing. This optical system comprises a conventional photographic objective lens 22, shown mounted on the upper portion of forward wall 12, and a reflecting element, preferably a front surface mirror 24, mounted behind and in alignment with lens 22 for reflecting light from the lens at generally a right angle toward the opposite end of the camera housing. Alternatively, mirror 24 may be located behind an opening 23 in wall 12 and the lens located in the optical path after the mirror as shown in FIG. 4. This construction is less preferred because a front surface mirror requires protection afforded by the lens.

The camera includes a diaphragm associated with the optical system for controlling the exposure aperture. The diaphragm is located in the path of light from lens 22 to the film, and in the form shown, comprises a pair of diaphragm blades 26 and 28 mounted in face-to-face, sliding relation in channels 30. The channels are part of a wall 32 located in the upper portion of the camera housing and separating the camera housing into a chamber designated 34 in the upper end of the camera housing in which are mounted the principle components of the image-forming optical system and an exposure aperture control system. Blades 26 and 28 extend across the path of light from mirror 24, and each blade is provided with an opening 36 tapered at the end thereof opposite the tapered end of the opening in the other blade. Openings 36 cooperate to define an exposure aperture the size of which may be varied by sliding the blades relative to one another to change the loci of the intersections of the edges of the tapered portions of the openings. Blades 26 and 28 include, respectively, extended portions 38 and 40 for engaging inclined cams 42 and 44, coupled with a button 46 located outside of the camera housing so as to be manually engageable for movement in a direction perpendicular to the direction of movement of blades 26 and 28. Movement of button 46 causes associated cams 42 and 44 to coact with extended portions 38 and 40 to open or close the exposure aperture defined by openings 36. Alternatively, blades 26 and 28 may be located directly behind lens 22 between it and mirror 24.

A photometric system, similar to the system shown and described in the copending U.S. application of Edwin H. Land, Ser. No. 359,116, filed Apr. 13, 1964, now U.S. Patent No. 3,323,431, issued June 6, 1967, is provided for controlling the size of the exposure aperture. This system includes a variable aperture 48 defined by openings in portions 50 of blades 26 and 28 for passing light from the subject to a mirror 52 which redirects the light to one side of a light transmitting target 54. Target 54 is visible to the operator through a window 56 and mirror 58, and a standard lamp 60 illuminates the side of target 54 visible to the operator. Target 54 is provided with indicia that are differentially visible depending upon the relative brightness of light falling on opposite sides of the target and the exposure aperture is properly set by moving button 46 to adjust aperture 48 so that the proper indicia on target 54 is visible.

A conventional viewfinder 62, for example, of the albada type, is also provided in the upper portion of the camera housing adjacent lens 22.

As previously noted, a narrow elongated image of a portion of the scene is formed in an exposure plane in the camera by the image-forming optical system. The exposure system preferably includes an aperture located substantially at the exposure plane for determining the dimensions of the incremental area of the photosensitive sheet being exposed at any instant during movement of the sheet in the exposure plane past this aperture. Since the width dimension of this narrow aperture in the exposure plane is also determinative of the length or duration of exposure, exposure values can be varied simply by changing the width of the aperture as well as by varying the size of aperture 48. The image formed by objective lens 22 is moved at the exposure plane relative to the aperture therein preferably by pivoting mirror 24. For this purpose, mirror 24 is mounted for pivotable movement about an axis intersecting and perpendicular to the optical axis of lens 22 so as to displace the image forwardly and rearwardly within the camera housing. Suitable means (described hereinafter) are provided for pivoting the mirror simultaneously with movement of the film and coordinating movement of the photosensitive material and the image formed on the photosensitive material in the exposure plane.

The exposure plane of the camera shown is substantially perpendicular to the axis of lens 22 and second reflecting means in the form of a prism or mirror 49 is provided, as shown in FIG. 4, located between the stacks of photosensitive and second sheets near the end thereof opposite mirror 24 for redirecting light transmitted by mirror 24 between the stacks of photosensitive and second sheets toward the exposure plane. Means defining an exposure aperture are provided in this exposure plane and these last-mentioned means together with the second reflecting means, may comprise components of the camera as shown in FIG. 4, or components of the film assembly (see FIG. 6) employed in the camera.

The photosensitive and second sheets employed in the camera are incorporated in a film assemblage or film pack, shown in FIGS. 3 and 6, and designated 66. Film pack 66 includes all of the materials required for producing a plurality of visible positive prints, either in black and white or color, by a diffusion-transfer process. These materials include a plurality of photosensitive, image-recording sheets 68, each comprising a photosensitive material such as a silver halide, and a plurality of second or image-receiving sheets 70 that function to aid in the treatment of the photosensitive material with a liquid processing agent and/or include a layer receptive to image-forming substances produced by the liquid processing agent in the photosensitive sheet and transferred therefrom by diffusion to the receiving layer. The liquid processing agent may be supplied in a number of different ways including impregnation into the second sheet 70 or as shown, in a rupturable container 72 mounted on each sheet 70 near the leading edge of the area of the second sheet, to be treated with the liquid in conjunction with an exposed area of a photosensitive sheet.

Suitable materials useful in film assemblage 66 are well-known in the art and include materials such as disclosed in U.S. Patents Nos. 2,543,181, issued Feb. 27, 1951, and 2,662,822, issued Dec. 15, 1953, to Edwin H. Land for producing silver transfer prints; and materials for producing color prints by processes disclosed, for example, in U.S. Patent No. 2,983,606, issued May 9, 1961, to Howard G. Rogers and utilizing integral multilayer photosensitive sheets incorporating dye developers such as are disclosed in the copending U.S. application of Edwin H. Land et al., Ser. No. 565,135, filed Feb. 13, 1956, now U.S. Patent No. 3,345,163, issued Oct. 3, 1967.

Film pack 66 comprises a first container 74 including an inner wall 76 and an outer wall 78 for holding a plurality of photosensitive sheets 68 arranged in stacked relation, and a second container 80 comprising an inner wall 82, an outer wall 84, for holding an equal number of second sheets 70 arranged in stacked relation. The two containers are secured together with inner walls 76 and 82 located in spaced-apart, face-to-face relation by side members 86 that cooperate with the inner walls to define a passage 88 between the containers holding the photosensitive and second sheets.

The exposure plane, that is, the plane in which the portion of the photosensitive sheet being exposed is moved during exposure, is located within container 74 at one end thereof beyond the leading edge of the areas of the photosensitive sheets adapted to be exposed. This exposure plane is also substantially parallel with the planes of the stacked photosensitive sheets and is defined by a surface against which the photosensitive sheets are supported during movement across a narrow elongated exposure aperture. The exposure aperture, as previously noted, may be defined by a component of the film pack, for example, the exposure aperture shown in FIGS. 3 and 6 is a narrow exposure opening 90 through inner wall 76 of container 74 extending substantially from side to side of the container. Light for exposing the photosensitive sheets is directed by the optical system of the camera from the end of passage 88 opposite exposure opening 90 lengthwise of the passage and is reflected by a 45° mirror through exposure opening 90 for exposing a photosensitive sheet during movement thereof past the opening. This mirror may comprise a component of the camera (see mirror 49 in FIG. 4) or, as shown in FIGS. 3, 5 and 6, a prism 92 provided as a component of the film assemblage.

In the embodiments of the film assemblage, shown in FIG. 4, the innermost photosensitive sheet is the sheet designed to be moved and exposed. However in another form of film assemblage shown for example, in FIG. 3, the outermost photosensitive sheet is the sheet that is adapted to be moved and exposed while other photosensitive sheets located to the inside of this outermost sheet remain stationary. To permit exposure of the outermost photosensitive sheet, the photosensitive sheets are formed with openings 94 located in alignment with exposure opening 90 in inner wall 76 for transmitting light to the outermost photosensitive sheet during movement thereof across the openings in the wall and photosensitive sheets. The portions of the photosensitive sheets on opposite sides of openings 94 may be joined by lateral marginal portions of the sheets, or by connecting elements, such as threads, that are narrow and connect otherwise separate sheets. In this embodiment the exposure plane is located at the inner surface of the outermost photosensitive sheet and is defined by the surface of a light transmitting element such as a portion 96 of prism 92. Portion 96 extends through exposure opening 90 in wall 76 and has a planar, outer surface for supporting the photosensitive sheets during movement and exposure. The camera includes a pressure member 98 for pressing against outer wall 78 to support the photosensitive sheets in the exposure plane during movement relative to and across opening 90.

Portion 96 of prism 92 performs the additional function of holding the innermost photosensitive sheets stationary during movement and exposure of the outermost photosensitive sheet by extending into the openings in the inner photosensitive sheets. At least outer wall 78 of container 74 may be quite flexible, and extends beyond the end of inner wall 76 to facilitate light sealing of the opening between the inner and outer walls through which the photosensitive sheet is withdrawn.

The camera includes means in the form of a pair of pressure-applying rolls 100 and 102 mounted in juxtaposition adjacent the end of the film assemblage and means for rotating the rolls in engagement with a photosensitive and second sheet for withdrawing the sheets, end first, from the film assemblage, pressing the sheets into face-to-face contact and distributing the liquid contents of a rupturable container 72 between and in contact with the surface of the exposed area of the photosensitive sheet and the adjacent surface of the second sheet. Rolls 100 and 102 are preferably cylindrical and may include surfaces formed of a material such as an elastomer having a high coefficient of friction. Both rolls are rotated to insure advancement of the sheets of a film unit between the rolls.

Rolls 100 and 102 are preferably rotated by a motor, designated 104, located within the end portion of the housing and coupled with rolls 100 and 102 through a transmission including gears 106 and an overrunning slip clutch 108. Motor 104 may comprise an electric motor in which case provision is made in the housing for a source of current, such as batteries, for operating the motor; or motor 104 may be spring driven in which event the camera will include suitable means such as a crank for tensioning the spring that drives the motor.

The camera includes means for advancing the leading ends of a photosensitive and second sheet, or a leader coupled therewith, into engagement with the rolls at the nip of the rolls so that rotation of the rolls is effective to advance the sheets therebetween. The construction and operation of these means in the camera are dependent upon the construction of the film assemblage adapted to be employed in the camera. The film assemblage, shown in FIG. 4, comprises a plurality of photosensitive and second sheets that are unconnected and arranged for exposure of the innermost photosensitive sheet. In this embodiment, the leading end portions 110 of photosensitive sheets 68 are folded inwardly upon themselves and are located in position to be engaged by the leading edges of the second sheets as the latter are advanced from second container 80 in which they are enclosed. Either the innermost or the outermost second sheet 70 may be advanced into engagement with the folded leading edge portion 110 of the innermost photosensitive sheet to advance both sheets into the nip of rolls 100 and 102.

The means for feeding the second sheets into engagement with the photosensitive sheets and advancing both sheets into engagement with the pressure-applying rolls may be located either between the two stacks of sheets (as shown in FIG. 4) or outside the stacks of sheets as shown in FIGS. 3 and 5. A preferred form of sheet-advancing means is adapted to project through an opening in either the inner 82 or outer 84 wall of container 80 for frictionally engaging the outermost or innermost second sheet 70, and in the form shown in FIGS. 6 and 7, comprise a friction plate 112 movable in engagement with a sheet in the film pack. Friction plate 112 is engaged with one end of a pivotable lever 114 in turn coupled with means for pivoting the lever to reciprocate the friction plate. Friction plate 112 may comprise a component of the camera or a component of the film assemblage and preferably includes a generally rigid or inflexible support plate having a surface layer or a material such as an elastomeric foam characterized by its high coefficient of friction. Lever 114 is shown in FIG. 3 pivotally mounted on forward wall 12 of the camera housing. The latter preferably comprises a door which may be opened to permit loading of a film assemblage into the housing. Outer wall 84 of the film pack is provided with an opening 116 through which a pin on friction plate 112 extends into engagement with a slot in the end of lever 114, or a larger opening for accommodating the friction plate when the latter is a component of the camera to enable the friction plate to extend into engagement with the outermost image-receiving sheet 70. To enable the operator to pivot lever 114, the end of the lever may extend through an opening in the side wall of the camera housing and is coupled with a manually engageable button (not shown) movable to pivot the lever and advance the outermost (forwardmost) second sheet toward rolls 100 and 102. A similar arrangement may be provided between the stacks of photosensitive and second sheets, as shown in FIG. 4, in which case inner wall 82 of container 80 is provided with an opening 118 for friction plate 112 or a pin mounted thereon.

In the embodiment of the film assembly shown in FIGS. 3 and 7, both the photosensitive and second sheets are moved by means within the camera into engagement with the pressure-applying rolls at the nip thereof so that two devices including friction plates 112 and levers 114 coupled with one another are provided for engaging the outermost photosensitive and second sheets and advancing the leading edges of the sheets into the nip of the rolls.

The camera includes manually operable means for initiating rotation of rolls 100 and 102 to advance a pair of sheets, exposing a photosensitive sheet and pressing the two sheets into superposition while distributing processing liquid between the sheets. These means, in the case of an electrically driven motor, include a switch, and in the case of a spring driven motor, include a releasable brake and may be coupled with the device that advances the sheets into engagement with the pressure-applying rolls or may include a separate manually engageable trigger.

Another form of means for advancing a photosensitive and second sheet into the nip of the pressure-applying rolls is shown in FIG. 5 and comprises a flexible tongue 120 mounted for reciprocating movement on the forward wall of the camera housing and coupled with a button 122 manually engageable exteriorly of the housing. In this embodiment, the leading ends of each pair of photosensitive and second sheets are coupled at a leader having a folded end portion 124 and tongue 120 movable into engagement with folded end portion 124 to advance the latter into the nip of the pressure-applying rolls.

The camera includes means mounting mirror 24 for pivotable movement and pivoting the mirror during exposure of each photosensitive sheet. These means comprise a shaft 130 on which mirror 24 is mounted, in turn, pivotably mounted in the camera and coupled with an arm 132 engaged with a pivotable lever 134 having a cam follower 136 on the end thereof opposite arm 132. Follower 136 engages a cam 138 coupled through gears 140 and 106 to motor 104 for rotation thereby during advancement of a photosensitive sheet.

The pressure-applying rolls are rotated so as to advance the superposed photosensitive and second sheets directly from the camera housing through a passage 126 in forward wall 12. Accordingly, each photosensitive and second sheet includes a layer or a support that is opaque to actinic light enabling the sandwich, comprising the sheets laminated together by the processing liquid, to be advanced directly into the light during processing. An alternative embodiment of the camera may include a processing chamber into which the photosensitive and second sheets may be advanced from between the pressure-applying rolls in which case light opacity is not a necessary characteristic of the photosensitive and second sheets.

The film assemblage includes means for trapping and retaining excess processing liquid and preventing advancement of a sandwich so that it becomes completely disassociated from the camera. These means include spacing or trapping members 128 mounted on the trailing ends of the photosensitive and/or second sheets adjacent the margins thereof for separating the pressure-applying rolls as the trapping members move therebetween in order to provide a space between the trailing end portions of the sheets in which excess processing liquid is collected and retained. Pressure-applying rolls 100 and 102 are mounted for limited movement toward and away from one another and are biased toward one another by a spring with sufficient tension such that motor 104 is unable to rotate rolls 100 and 102 and advance the trapping members between the rolls when the members enter the bite of the rolls. An overrunning clutch 108 is designed to slip when the spacing members enter the nip of the rolls permitting the rolls to cease rotating even though the motor may continue to operate, the latter preferably being overdriven in order to insure advancement of the sheets to the extent desired. When the movement of the sandwich is discontinued, the leading portion of the sandwich projecting from the camera housing may be gripped by the operator for withdrawing the sandwich completely from the camera with the overrunning clutch facilitating this latter operation.

The nature and composition of the materials employed in the camera, the method of supplying and distributing the processing liquid, the structure of the film assemblage, and the process performed and product produced by the camera, may be varied in a number of different ways, each of which may require modification of the basic camera structure to accommodate a particular film construction and processing combination. For example, the processing liquid may be provided in an elongated tubular (straw-shaped) container that is not associated with the sheet materials employed in the camera, but is moved relative to a sheet to dispense its contents thereon for subsequent distribution in contact with the sheet. Materials of this type are disclosed together with methods and means for dispensing and distributing processing liquid in U.S. Patent No. 3,047,387, dated July 31, 1962. For a camera structure including means providing for introduction and withdrawal of a container of this type into and from the camera and for dispensing the liquid contents of the container onto a sheet during withdrawal from the camera, reference may be had to U.S. Patent No. 3,152,530, dated Oct. 13, 1964. An alternative processing system adaptable to incorporation in the camera of the invention may take the form shown in the copending U.S. patent application of Edwin H. Land, Ser. No. 357,391, filed Apr. 6, 1964, comprising a container of the processing liquid and means for advancing the sheets through the container.

Another basic approach to processing of the exposed image-recording material to produce a visible image, particularly desirable because it provides for substantial simplification of the camera structure, is to employ a sheet material impregnated with the processing liquid. The photosensitive layer may be processed simply by pressing the sheet which it comprises into contact with the sheet impregnated with the processing liquid. Simplification of the camera is achieved to the extent that the pressure-applying members are not required to distribute the processing liquid between the sheets but merely press the sheets into face-to-face contact. A typical film structure of this type is shown by way of example in FIG. 8 of the drawings, as comprising a combination image-recording and image-receiving element 150 and a liquid carrying element 152 adapted to be superposed with the image-recording element to effect the processing thereof, preferably to produce a visible (positive) transfer image in element 150. Element 150 is shown in FIG. 8 as comprising a transparent support 154 formed of one of the organic plastic materials commonly employed in photography for film base. Carried on support 150 are, in order, an image-receptive layer 156, a masking layer 158, and a photosensitive, image-recording layer 160. The composition of the photosensitive and image-recording layers will depend upon the particular visible image-forming transfer process to be performed, and the nature and composition of the transferred substances forming the visible image. The photosensitive layer may comprise a silver halide emulsion or may be composed of a plurality of strata incorporating silver halides and dye developers as disclosed in the aforementioned application, Ser. No. 565,135, now U.S. Patent No. 3,345,163, issued Oct. 3, 1967. Image-receptive layer 156 is adapted to receive and support an image-wise distribution of image-forming substances constituting the visible image and suitable materials and compositions for this purpose are known in the art and include, for example, silver precipitating nuclei, in the case of a silver transfer process, and materials substantive to dyes, in the case of a process involving formation of a dye image. In the processing of element 150, image-forming substances are transferred by diffusion from the photosensitive to the image-receptive layer 158 which provides a background for the transfer image (viewed through the transparent support) and masks the image (negative) in the photosensitive layer. Materials useful for the masking layer include, for example, pigments such as finely divided titanium dioxide dispersed in a suitable permeable, colloidal carrier or matrix, such as gelatin, which is permeable to an aqueous (alkaline) processing liquid.

The processing liquid is basically water and may include one or more of the processing agents such as an alkali, silver halide developer, silver complexing agent, or the like, necessary to produce the transfer image, while other processing agents such as the aforementioned dye developers may be incorporated in a layer of element 150. Liquid carrying element 152 comprises a support 162 formed of a material chemically inert to and insoluble in the aqueous liquid and a liquid carrying layer 164 bonded to the support and impregnated with the aqueous liquid. Layer 164 comprises a highly permeable material such as polyvinyl alcohol, swollen with and containing sufficient liquid to effect the desired transfer process when pressed against an exposed photosensitive layer. Although in the embodiment described, element 150 comprises both photosensitive and image-receptive layers, in an alternative process the image-receptive layer may be omitted from element 150 and sheet 152 would then be designed to function as an image-receiving layer as well as a source of processing liquid. For a more detailed description and example of a liquid impregnated image-receiving sheet of the type useful in the camera and film assemblage of the present invention, reference may be had to the copending U.S. patent application of Edwin H. Land, Ser. No. 298,968, filed July 31, 1963, now U.S. Patent 3,254,583, issued June 7, 1966. The composition of the liquid carried by element 152 may be varied substantially in order to effect a particular process desired while the basic structure of the element remains substantially unchanged, for example, as shown and described in the last-mentioned application.

Liquid impregnated element 152 may be provided in the form of individual rectangular sheets or as a continuous strip comprising a plurality of areas adapted to be employed in processing successive exposed image-recording elements and is stored in and dispensed from a container that, in the preferred form, is hermetically sealed to prevent evaporation of the processing liquid and/or reaction of the liquid with the atmosphere. When provided as a plurality of sheets, elements 152 are stored in an air-tight container having an opening or slit through which the sheets are withdrawn and means for sealing or closing the opening against the admission of air and/or the escape of water vapor when a sheet is not being withdrawn. The liquid impregnated elements may be connected by other sheets or mounted on a zigzag folded carrier strip, or they may be unconnected and means may be provided within the container, operable from the outside thereof, for advancing each element 152 from the container into superposition with a photosensitive element in the bite of a pair of juxtaposed pressure-applying rolls.

Elements 150 and 152 are pressed into contact with one another by passing them between the pressure-applying rolls, and may be retained in the camera or advanced directly from the camera into the light. In the latter process, premature exposure of photosensitive layer 160 is prevented by providing a support 162, or a layer thereon, that is opaque to actinic light, and an opaque cover sheet 166 adhered to support 154 by an adhesive that permits stripping of the cover sheet from the transparent support. In an alternative embodiment, liquid carrying sheet 152 is supplied as a single, elongated strip stored in a liquid and vapor impermeable cassette or container as shown in FIG. 9. The container or cassette, designated 170, is designed to hold element 152 in a tightly coiled condition and includes an exit passage provided with sealing element 172 through which successive portions of element 152 may be withdrawn.

A camera designed to employ a combined image-recording and image-receiving element 150 and a liquid carrying element 152 coiled in a cassette 170, and to process element 150 entirely within a light-free environment, is shown in FIG. 9. Camera 176 is basically the same as the cameras described heretofore and includes a housing with a forward wall 178, an exposure aperture 179 in its forward wall near one end, a pivotal mirror 180 located behind the exposure aperture for directing light through a lens 182 toward the opposite end of the camera housing, and means in the form of a 5-sided prism 184 for twice reflecting light from lens 182 and directing the light toward the image-recording element during exposure thereof. In this embodiment an odd number of reflections are required because the transfer image is viewed from the side opposite the photosensitive layer from which it was formed and would appear as a mirror image were it not for the odd reversal.

A plurality of image-recording sheets 150 coupled to one another by connecting sheets 186 are supplied arranged in stacked relation in a generally parallelepiped, shaped container 188 having a forward wall 190 with an exposure slot 192 near one end and a wall 194 with an exit slot 196 adjacent the forward wall and exposure slot 192. Each connecting sheet 186 extends from the trailing end of a sheet 150 to the leading end of the next succeeding sheet and provides means for withdrawing the next succeeding sheet from container 188. A spring (not shown) is mounted within the container in the rear wall thereof for supporting the image-recording sheets against the forward wall in alignment with exposure slot 192. The container of image-recording sheets is mounted within the camera housing with exposure slot 192 aligned with the rear face of prism 184 with a space between forward wall 178 of the camera housing and forward wall 190 of the container through which light is transmitted from lens 182 to prism 184. The camera housing includes a rear wall 197 provided with an opening closed by a door 198 and cooperating with the rear wall of container 188 to provide a processing chamber 100 into which the superposed image-recording and liquid carrying elements 150 and 152 are advanced after having been pressed into face-to-face contact.

Cassette 170 containing liquid carrying sheet 152 is mounted within the camera housing between end wall 194 of container 188 and the end of the camera housing opposite lens 182. The means for advancing the photosensitive sheets from container 188 past exposure slot 192 and pressing each exposed image-recording sheet into superposition with liquid carrying sheet 152, comprise a pair of pressure-applying rolls 102 and 104 mounted in juxtaposition between the end of film container 188 and cassette 170 with the periphery of roll 102 substantially tangent with the plane of movement of sheets 150 through slot 196 and roll 104 disposed toward the rear of the camera housing on the opposite side of roll 102 from container 188. A motor 106 and a suitable transmission (not shown) are provided for driving rolls 102 and 104 during exposure and processing of image-recording element 150. A guide 108 is provided between roll 102 and rear wall 198 for guiding the sandwich comprising the superposed sheets from the rolls into processing chamber 100.

The camera of FIG. 9 is illustrated as it would appear during exposure of an image-recording sheet 150, that is, during withdrawal movement of the image-recording sheet from container 188 across exposure slot 192 through slot 196 and into superposition with sheet 152 between the pressure-applying rolls. Following advancement of a sandwich comprising the superposed image-recording and liquid carrying sheets into the processing chamber, the sandwich is allowed to remain in the processing chamber for a period of predetermined minimum duration during which formation of a visible transfer image occurs. At the termination of the processing period, door 198 is opened and the sandwich containing the visible image is removed. A number of modifications may be made to this basic form of camera, including, for example, provision for advancing the sandwich between the rolls directly from the camera rather than into a processing chamber within the camera. This embodiment will permit a camera that is thinner by an amount equal to the thickness of the processing chamber, but will necessitate provision of a strippable opaque cover sheet 166 on transparent support 154 and an opaque support 160 for liquid carrying sheet 152. The camera may also be provided with means within the processing chamber for facilitating the severance of the sandwich from the remainder of the sheet materials within the camera; and in the embodiment in which the sandwich is advanced directly from the camera, such sheet severing means would be associated with the exit opening.

It will be seen from the foregoing that the invention provides a novel and very compact, non-folding, box type, self-developing camera in which the processing mechanism effectively takes the place of the usual shutter thereby reducing not only the size but the complexity and cost of the camera; and a film assembly especially adapted for use in this camera. The camera is designed to take rectangular pictures and is characterized by a compact structure having length and width dimensions governed by the picture size and a third (thickness) dimension that is but a fraction of the longest linear (diagonal) dimension of the picture produced. This compact construction together with processing capability is achieved without special provision for folding or collapsing portions of the camera housing, in what is essentially a box camera construction. The film assembly of the invention is especially adapted for use in this camera and may not only incorporate a component of the optical system, but may also include a component of the exposure system effectively functioning as a shutter to determine exposure values. The novel and unobvious relationships and cooperation between the camera, the processing system thereof and the film assemblage, are significant factors in providing the improved compactness and operating characteristics of the camera.

Since certain changes may be made in the above product and apparatus without departing from the scope of the invention herein involved, it is intended that all matter contained in the above description or shown in the accompanying drawings shall be interpreted as illustrative and not in a limiting sense.

What is claimed is:

1. A compact camera comprising in combination:
means for holding a photosensitive sheet in an initial position substantially in a flat plane;
means near one end of said sheet for directing light along an optical path generally parallel with said sheet toward the opposite end thereof and forming an image in an exposure plane near said opposite end;
means for moving said sheet from said initial position relative to said exposure plane;
means adjacent said exposure plane for causing said light path and the path of movement of said sheet to intersect at said exposure plane to expose said sheet during movement thereof; and
means for moving said image relative to said exposure plane during exposure to maintain said image and said sheet relatively stationary.

2. A camera as defined in claim 1 including reflecting means near said opposite end of said sheet for directing light traveling along said light path toward said plane of said sheet.

3. A camera as defined in claim 1 including means for holding a second sheet in an initial position in substantially parallel, superposed relation with said photosensitive sheet and means for moving said second sheet into superposition with said photosensitive sheet during exposure of the latter.

4. A compact box camera comprising, in combination:
a housing for holding a photosensitive image-recording element in an initial position;
means for moving said housing element within said housing from said initial position past an aperture in position for exposure by light transmitted through said aperture;
an optical system including a lens for forming an image at said aperture to expose said moving element through said aperture and produce by said motion of said element an image in an area of said element comprising the major portion thereof; and
means for moving said image formed by said lens relative to said aperture in the direction of movement of said element past said aperture to maintain said image formed by said lens substantially stationary with respect to said element during exposure thereof;
said housing having length and width dimensions exceeding the length and width, respectively, of said image formed by said lens in said element and a thickness dimension that is a fraction of the longest linear dimension of said image.

5. A camera as defined in claim 4 having a thickness dimension that is less than one-half the longest linear dimension of said image.

6. A camera as defined in claim 4 for exposing a generally rectangular area of said element, including means defining a narrow aperture and transversely of the direction of movement of said element past said aperture.

7. A camera as defined in claim 4 wherein said housing includes means for holding a plurality of generally rectangular, image-recording elements in initial positions in stacked relation and moving said elements in succession past said aperture to expose and form images in an area of each of said elements comprising the major portion of each of said elements.

8. A camera as defined in claim 4 including processing means for treating said exposed image-recording element with a liquid during movement of said element past said aperture.

9. A camera as defined in claim 8 wherein said processing means include means for moving said image-recording element past said aperture to expose said element.

10. A camera as defined in claim 9 wherein said lens is located near one end of said housing, said processing means are spaced from said lens toward the opposite end of said housing, and said optical system includes means for directing light from said lens lengthwise within said housing toward said opposite end and said aperture.

11. A compact camera for exposing a photosensitive sheet and treating said sheet in conjunction with a second sheet comprising, in combination:
means for holding a photosensitive sheet and a second sheet in initial positions in facing, spaced apart relation;
means for moving said photosensitive sheet past an aperture located near one end of said photosensitive sheet when the latter is in said initial position;
an optical system including image-forming means located near the opposite end of said sheets for directing light along a path between said sheets toward said one end of said sheets to form an image at said aperture and expose said moving photosensitive sheet through said aperture during movement of said photosensitive sheet past said aperture and means for moving said image relative to said aperture in the same direction as said photosensitive sheet;
means for coordinating movement of said image and said photosensitive sheet to maintain said image substantially stationary with respect to said photosensitive sheet; and
means for moving said second sheet from said initial position thereof into superposition with said photosensitive sheet following exposure of said photosensitive sheet.

12. A camera as defined in claim 11 wherein said means for moving said photosensitive sheet past said aperture include means for engaging the inner surface of at least one of said sheets to move said sheet substantially in said direction of movement of said photosensitive sheet past said aperture.

13. A camera as defined in claim 11 wherein said means for moving said photosensitive sheet past said aperture include means for engaging the outer surface of at least one of said sheets to move said sheet substantially in said direction of movement of said photosensitive sheet past said aperture.

14. A camera as defined in claim 11 including means for holding a plurality of said photosensitive and second sheets in separate stacks located in spaced facing relation; and
said optical means direct light along a path between said stacks of said sheets toward said one end of said sheets.

15. A camera as defined in claim 14 wherein said means for moving said photosensitive sheet engage and move the innermost of said photosensitive sheets past said aperture.

16. A camera as defined in claim 14 wherein said means for moving said photosensitive sheet engage and move the outermost of said photosensitive sheets past said aperture.

17. A camera as defined in claim 11 wherein said means for moving said photosensitive sheet and said second sheet are adapted to move said sheets simultaneously relative to and past said aperture and into superposition.

18. A camera as defined in claim 11 wherein said means for moving said photosensitive sheet past said aperture include advancing means for pressing said sheets into superposition while moving said superposed sheets and means for engaging at least one of said sheets in said initial positions into engagement with said advancing means.

19. A camera as defined in claim 11 including means defining said aperture located in the path of light from said image-forming means to said photosensitive sheet for contacting said photosensitive sheet during movement thereof; and
said aperture is relatively narrow and elongated and extends transversely of the direction of movement of said photosensitive sheet.

20. A camera as defined in claim 19 including means associated with said aperture for varying the width of said aperture.

21. A camera as defined in claim 11 wherein said optical system includes reflecting means positioned in said light path between said sheets for directing light from said lens toward said aperture along a path generally perpendicular to said direction of movement of said photosensitive sheet past said aperture.

22. A camera as defined in claim 11 wherein said image-forming means include an objective lens, said means for moving said image relative to said aperture include reflecting means having a reflecting surface, and the last-mentioned means include means for changing the angular relationship between said reflecting surface and the optical axis of said lens about a line substantially perpendicular to said optical axis and parallel with the plane of movement of said photosensitive sheet past said aperture.

23. A camera as defined in claim 22 wherein said last-mentioned means include means for varying the distance between said reflecting surface and said lens during movement and exposure of said photosensitive sheet to maintain the size of said image substantially constant.

24. A camera for exposing a photosensitive sheet and treating said photosensitive sheet in conjunction with a second sheet to produce a visible image of a scene, said camera comprising, in combination:
means for holding said photosensitive and second sheets in initial positions separated from one another;
means for forming an image of a scene with a portion of said image located substantially at an exposure plane and moving said image in said exposure plane; and
means for moving said photosensitive and second sheets from said initial positions along convergent paths into superposition and contacting the facing surfaces of said sheets with a processing liquid;
the last-mentioned means including means for supporting a relatively narrow transverse section of said photosensitive sheet in said plane and moving said sheet in the direction of movement of said image and at substantially the same speed as said image to expose successive transverse sections of said photosensitive sheet during movement thereof from said initial position into superposition with said second sheet and form an image of said scene in an area of said photosensitive sheet comprising the major portion thereof.

25. A photographic film assembly comprising, in combination:
a plurality of photosensitive sheets arranged in one stack;
a plurality of second sheets arranged in another stack;
container means for holding said stacks in facing relation;
means for spacing said stacks apart from one another to provide a passage therebetween open at one end; and
means located at the other end of said passage for passing light from said passage to the interior of said container means for exposing said photosensitive sheets during movement thereof within said container means relative to and past the last-mentioned means.

26. A photographic film assembly as defined in claim 25 wherein said last-mentioned means include means defining a relatively narrow aperture extending transversely of said photosensitive sheets and communicating between said passage and the portion of said container means holding said one stack.

27. A photographic film assembly as defined in claim 25 wherein said last-mentioned means include reflecting means for reflecting light entering said passage at said one end, through said aperture toward said one stack of photosensitive sheets.

28. A photographic film assembly as defined in claim 27 wherein said container means include means for guiding said photosensitive sheets substantially in a plane past said aperture and said reflecting means are constructed to direct said light in a direction substantially perpendicular to said plane.

29. A photographic film assembly as defined in claim 25 wherein said photosensitive sheets include portions aligned with said aperture for transmitting light entering said container through said aperture.

30. A photographic film assembly as defined in claim 25 wherein said second sheets are impregnated with a liquid photographic reagent reactable with said photosensitive sheets following exposure thereof to produce visible images in said photosensitive sheets.

31. A photographic film assembly, comprising in combination:
at least a photosensitive sheet and a second sheet adapted to be superposed with said sheet during treatment of the latter;
a container including means providing a first chamber for holding said photosensitive sheet, a second chamber for holding said second sheet in facing, spaced relation with said photosensitive sheet, and a third chamber located between said first and second chambers and open at one end of said container;
said container including at least an opening at the other end thereof communicating with said first and second chambers to permit withdrawal of said photosensitive and second sheets from said first and second chambers; and
means located at said other end of said third chamber for directing light from said third chamber into said first chamber to expose said photosensitive sheet during movement thereof from said first chamber past the last-mentioned means.

32. A photographic film assembly as defined in claim 31 wherein said last-mentioned means include means for directing light along a path through said aperture in a direction substantially perpendicular to the direction of movement of said photosensitive sheet past said aperture.

33. A photographic film assembly as defined in claim 31 including a plurality of said photosensitive and second sheets arranged in stacked relation in said first and third chambers and wherein said photosensitive sheets include portions located in alignment with said aperture for transmitting light entering said first chamber through said aperture.

34. A photographic film assembly as defined in claim 33 wherein said container is formed with an opening into at least one of said first and third chambers to permit engagement of a sheet therein by means for moving said sheet.

References Cited

UNITED STATES PATENTS

| | | | |
|---|---|---|---|
| 2,508,650 | 5/1950 | Pratt et al. | 88—24 |
| 2,894,436 | 7/1959 | Eber et al. | 95—11 |
| 3,002,437 | 10/1961 | Eloranta | 95—13 |
| 3,033,091 | 5/1962 | Eloranta | 95—13 |
| 3,217,623 | 11/1965 | Hotchkiss | 95—15 |
| 3,234,865 | 2/1966 | Scott | 95—15 |

NORTON ANSHER, *Primary Examiner.*

CHARLES B. FUNK, *Assistant Examiner.*